Dec. 27, 1955 L. B. PERSON ET AL 2,728,817

DEVICE FOR SYNCHRONIZING A RECEIVER TO THE TRANSMITTER IN A TIME DIVISION MULTIPLEX SIGNALLING SYSTEM

Filed June 9, 1952 2 Sheets-Sheet 1

Inventors
L. B. Person
C. H. Von Sivers
R. K. Wadö
K. R. Wickman
By Glascock Downing & Seebold
Attys Inventors
L. B. Person
C. H. Von Sivers
R. K. Wadö
K. R. Wickman
By [signature]
Attys.

United States Patent Office 2,728,817
Patented Dec. 27, 1955

2,728,817

DEVICE FOR SYNCHRONIZING A RECEIVER TO THE TRANSMITTER IN A TIME DIVISION MULTIPLEX SIGNALLING SYSTEM

Lars Bernhard Person and Carl Henric von Sivers, Stockholm, and Reid Kurt Wadö and Klas Rudolf Wickman, Hägersten, Sweden, assignors to Telefonaktiebolaget L M Ericsson, Stockholm, Sweden, a Swedish company Application June 9, 1952, Serial No. 292,567

Claims priority, application Sweden June 12, 1951

2 Claims. (Cl. 179—15)

Figure 1:
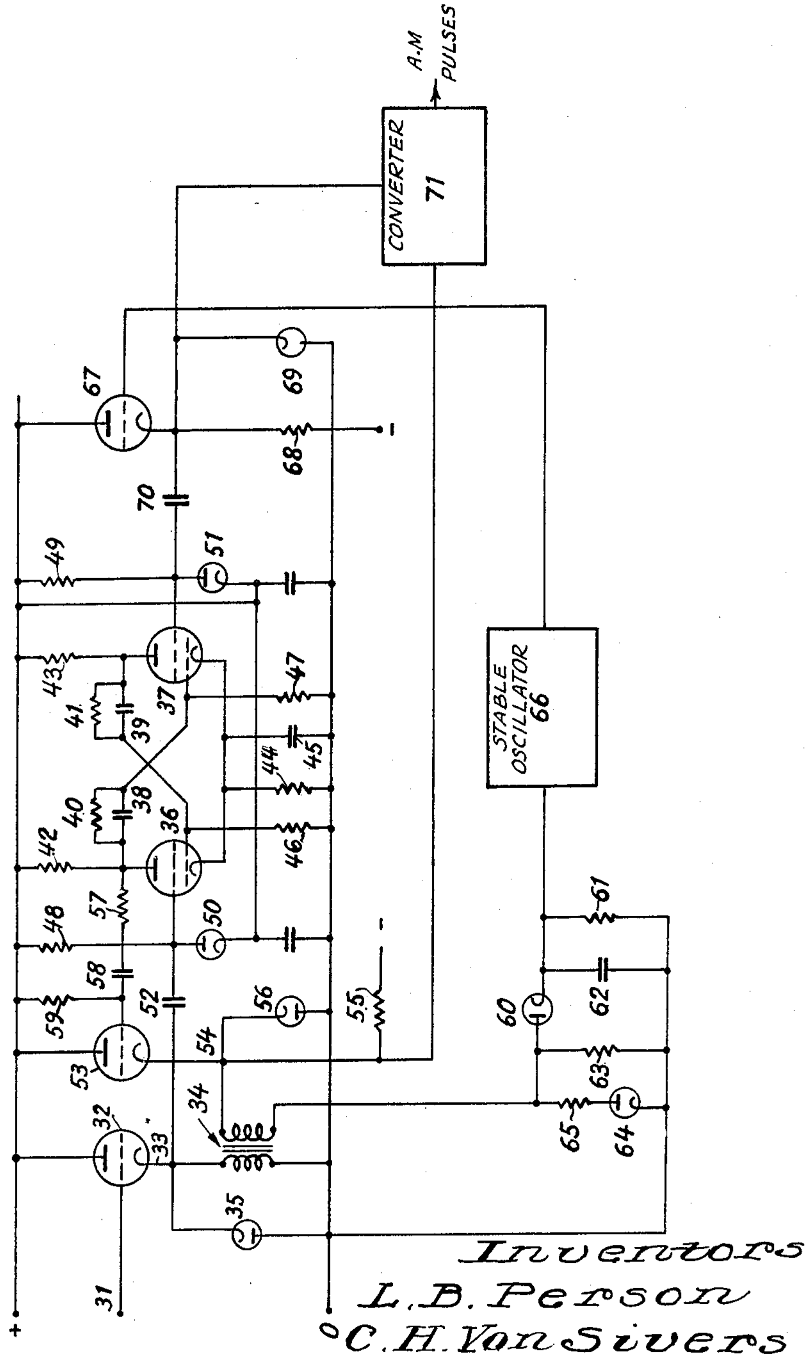

This invention relates to time division multiplex systems, i. e. systems in which the message of each channel is transmitted by a pulse train belonging to said channel, and the pulse trains of the different channels occur in succession during successive intervals of time.

The channel pulses transmit their respective messages by being modulated, e. g. in amplitude, duration or time position. Contrary to the channel pulses, the synchronizing pulses are usually not modulated. In order to allow them to be separated from the channel pulses the synchronizing pulses usually have another shape, e. g. another amplitude or duration, or they may consist of two or more closely adjacent pulses with an accurately determined interval between them.

In Swiss Patent No. 273,565 a method for synchronizing has previously been described, said method comprising a combination of a time position modulation of the synchronizing pulse train at the transmitter end by a modulation frequency which is a submultiple of the repetition frequency of the synchronizing pulses, and at the receiver end a filtering out of said modulation frequency by a selective circuit, after the demodulation of the time position modulated pulse trains, said circuit being tuned to said modulation frequency.

This invention relates to a device for synchronizing a receiver to the transmitter in a time division multiplex signalling system, in which the pulses of each channel are time position modulated, and in which synchronizing pulses having the same repetition frequency as the pulses of a single channel are time position modulated to that time displacement which is the maximum allowed displacement of the pulses of each channel, by a synchronizing channel modulation frequency which is a submultiple of the repetition frequency of the synchronizing pulses.

The invention is characterized by a duostable multivibrator arranged to be brought to flip in one direction by said time position modulated pulses and to flop in the other direction by pulses from a pulse generator, the repetition frequency of the latter pulses corresponding to the number of channels of the time position modulated pulse train multiplied by the repetition frequency of a single pulse channel, and an addition device arranged to add the voltage waveform of one of the anodes of said multivibrator to said time position modulated pulses in order to get a composite pulse train, said voltage waveform being preferably given approximately the same amplitude as the time position modulated pulses, said amplitude not exceeding a certain amplitude level, and a rectifier device arranged to be fed by said composite pulse train and to pass only the portions of said composed pulse train, which exceed said amplitude level and which portions are rectified to a regulation voltage, the amplitude of which will be dependent upon the repetition frequency and the time position of the pulses from said pulse generator, said regulation voltage being arranged to change the frequency of said pulse generator until synchronism is obtained, in which case the portions of said composite pulse train which exceed said amplitude level, are caused to be very small.

The invention makes possible a simple and reliable device for exactly synchronizing a receiver to a transmitter.

Figure 2:
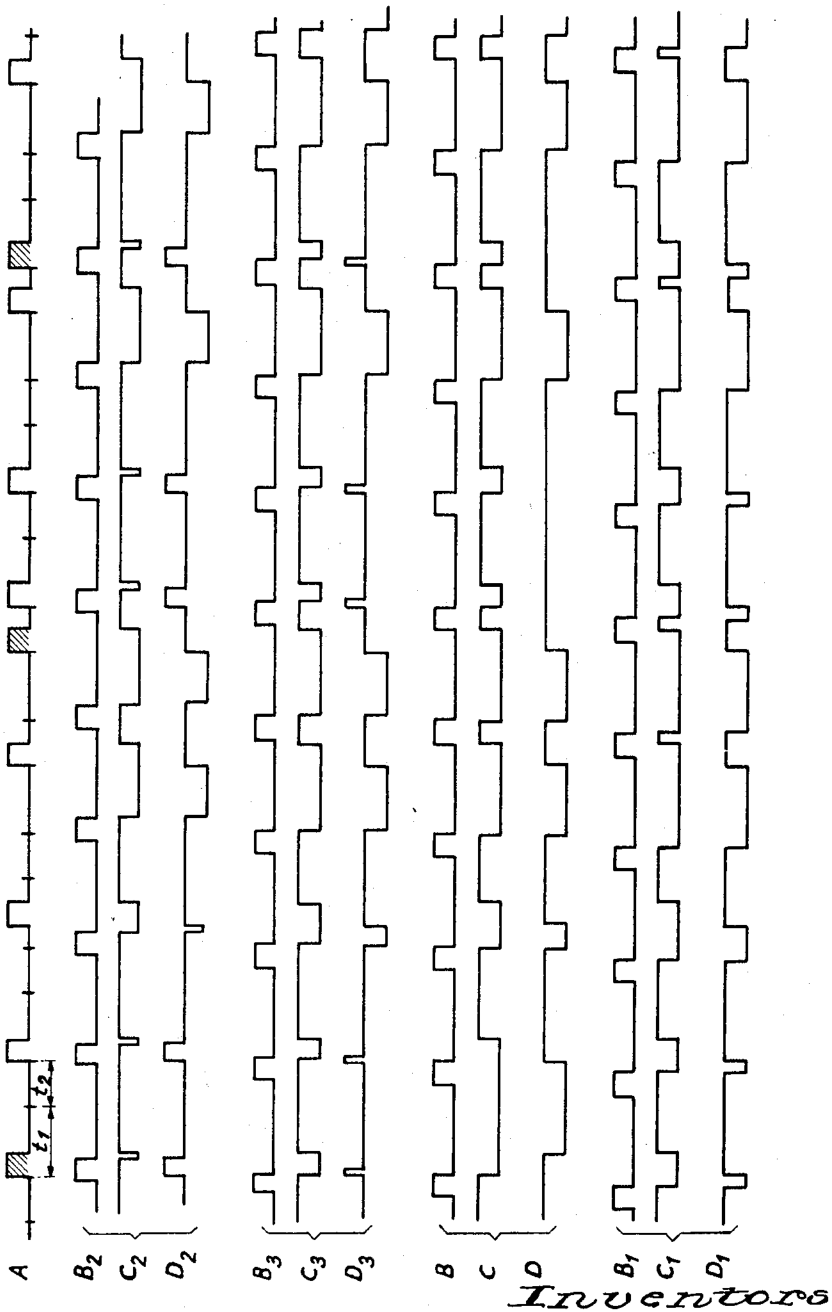

The invention will be described in connection with the accompanying drawing, in which Fig. 1 shows an embodiment of the invention and Fig. 2 shows waveforms in connection with said embodiment.

Fig. 1 shows a device according to the invention for synchronizing a local pulse generator to an incoming time position modulated pulse train, in which the synchronizing pulses are time position modulated with half the repetition frequency of a single channel pulse train. The device is also well suited to convert the time position modulated pulse train into an amplitude modulated pulse train, which will produce a modulation in accordance with the modulation of said time position modulated pulse train.

A time position modulated pulse train is applied to the control grid 31 of the tube 32. The anode of the tube is directly connected to a positive voltage source, indicated by + in the figure. The cathode 33 of the tube is connected to ground through the primary winding of a transformer 34. The cathode of the tube is also connected to the cathode of a diode 35, the anode of which is connected to ground. The device comprises also a duostable multivibrator. The multivibrator may be constructed in a great many ways, but here it consists of two pentodes 36 and 37, where each of the anodes has been connected to the control grid of the other tube by a respective condenser 38, 39, shunted by a respective resistor 40 and 41. The anode resistors 42 and 43 are connected to +, while the cathodes of the tubes are connected to each other and to ground through a common cathode resistor 44, which is shunted by a condenser 45. 46 and 47 are the grid leaks of the tubes, which are connected between respective control grids and ground. The screen grids of the tubes are connected to + through resistors 48 and 49, said resistors each being shunted by a diode 50 and 51, the cathodes of which are connected to +, and the anodes of which are connected to respective screen grids. The cathode 33 of the tube 32 is through a condenser 52 connected to the screen grid of the tube 36. 53 is a tube, the anode of which is directly connected to +, and the cathode 54 of which is via a resistor 55 connected to a negative voltage source, in the figure indicated by − (minus). The cathode of the tube is also connected to the cathode of a diode 56, the anode of which is grounded. From the anode of the tube 36 a resistor 57 is connected in series with a condenser 58 to the control grid of the tube 53. The grid leak 59 of said control grid is connected to +. The secondary winding of the transformer 34 has one of its ends connected to the cathode 54 of the tube 53 and the other end to a rectifier device consisting of a diode 60, the anode of which is connected to said secondary winding, and the cathode of which is connected to ground through a resistor 61 shunted by a condenser 62. In order to get a certain bias to the rectifier device the anode of the diode 60 is connected to ground through a resistor 63 shunted by a series connection of a diode 64 and a resistor 65. 66 is a stable oscillator of known construction, the frequency of which may be regulated, and which applies pulses to the control grid of the tube 67. The anode of that tube is directly connected to +, while the cathode is connected to minus through a resistor 68. The cathode of the tube 67 is further connected to the cathode of a diode 69, the anode of which is connected to ground. The cathode of the tube 67 is also connected through a condenser 70 to the screen grid of the tube 37.

The device functions in the following manner. To 31 there is applied a time position modulated multichannel pulse train, wherein the repetition frequency of the pulse train of a single channel is $f$. The synchronizing pulses of the pulse train are modulated to the maximum time displacement by half the repetition frequency, $f/2$. See Fig. 2A, wherein the synchronizing pulses have been shown shaded as distinguished from the other channel pulses. The modulation displacement interval of a channel pulse is indicated by $t_1$ and the safety interval by $t_2$. The time position modulated pulse train is amplified by the cathode coupler 32 and applied as positive pulses through the condenser 52 to the screen grid of the tube 36 in the multivibrator. Suppose this tube to be conducting, while the tube 37 is cut off. Then there is a voltage drop in the resistor 48 because of current to the screen grid. Suppose this voltage drop to be e. g. 2 volts. Thus the diode 50 has a bias of 2 volts and is non-conducting. When a positive pulse with an amplitude of e. g. 30 volts is applied through the condenser 52, the voltage of the screen grid will at first increase 2 volts causing the diode 50 to be conducting. Across the condenser 52 there will occur a voltage difference of 28 volts, and when the trailing edge of the positive pulse occurs, the voltage of the screen grid will decrease 28 volts in relation to the value of the voltage of the screen grid existing before the pulse had arrived. By a suitable dimensioning of the coupling components it is possible to cause the multivibrator to flip over to the other stable state with the tube 36 cut off and the tube 37 conducting by reason of said voltage decrease. From the generator 66 there is obtained a pulse train having a repetition frequency somewhat lower than $n \cdot f$, where $n$ is the number of channels including the synchronizing channel and $f$ is the repetition frequency of a single time position modulated channel pulse train. See Fig. 2B. The pulse train obtained from the point 66 is amplified by the tube 67 and applied through the condenser 70 to the screen grid of the tube 37, and causes, when the trailing edge of a pulse occurs, the multivibrator to flop back to the state, in which the tube 36 is conducting and the tube 37 cut off. Pulses will then be obtained, according to Fig. 2C, at the anode of the tube 36 and thereby also at the grid of the tube 53, the leading edges of said pulses coinciding with the trailing edges of the pulses of the time position modulated pulse train 2A, and the trailing edges of the first said pulses coinciding with the trailing edges of the pulses of the pulse train 2B from the pulse generator 66. Thus the pulse train 2C consists of pulses, the durations of which vary according to the mutual positions of the pulses of the pulse trains 2A respectively 2B. If by the help of the transformer 34 the pulses of the pulse trains 2A and 2C are added in suitable proportions, e. g. with the same amplitudes, the pulse train D will be obtained.

Suppose the amplitude of the pulse train A to be made equal to the amplitude of the pulse train C, which latter amplitude e. g. is $V_1$ volts. As is shown by Fig. 2D the pulse train D being the sum of the pulse trains A and C will then get a maximum amplitude of $V_1$ volts. This under the presumption that the pulses of the pulse train B will have their trailing edges at last at the end of the safety interval.

If the pulses generated by the pulse generator 66 have their trailing edges somewhat before the end of the safety interval, see Fig. 2B, the voltage of the anode of the tube 36 will be as shown by Fig. $2C_1$. By this pulse train being added to the time position modulated pulse train 2A the pulse train $2D_1$ will be obtained, having a maximum amplitude of $V_1$ volts.

If the pulses generated by the pulse generator 66 have their trailing edges somewhat after the end of the safety interval, see Fig. $2B_2$, the voltage of the anode of the tube 36 will be as shown by Fig. $2C_2$. By this pulse train being added to the time position modulated pulse train 2A the pulse train $2D_2$ will be obtained. Here the synchronizing pulses, which have their earliest position in the modulation interval, will be added to the pulse train $C_2$ in such a manner, that the amplitude of the pulse train $D_2$ at these times will get the amplitude $2V_1$ instead of $V_1$. Besides the synchronizing pulses also the channel pulses, which have their earliest position in the modulation interval, will be added to the pulse train $C_2$ in the same manner. In Fig. $2B_3$ there is shown a case, when the pulses from the pulse generator 66 have their trailing edges after the beginning of the modulation interval, but not as late as in the previous case, Fig. $2B_2$. Here too the amplitude of the resulting pulse train $D_3$ will get amplitudes of the value $2V_1$, as in the previous case but the duration of the parts of the pulse train $D_3$, which have the amplitude $2V_1$, will be less than in the previous case. When a time position modulated pulse has its earliest possible position the duration of the part of the pulse train $D_3$, which has the amplitude $2V_1$, will be equal to the part of the pulse from the pulse generator 66, which part occurs after the beginning of the modulation interval. In a practical case, when the pulses have sloping edges, also the amplitude of the parts of the pulse train $D_2$ or $D_3$, which exceeds the value $V_1$ volts, will vary continuously with the position of the pulse train A in relation to the pulse train $B_2$ or $B_3$. The energy of the parts of the pulse train $D_2$ or $D_3$, which exceed the value $V_1$ volts, may be used to give a regulation voltage to the generator 66 causing the position of the pulse train B to be locked in relation to A.

The utilization of the energy of the parts of the pulse train D, which exceed the value $V_1$ volts, may, according to Fig. 1, be made in such a manner that the pulse train D is applied to the rectifier device, which comprises the diode 60, the resistor 61 and the condenser 62. By the diode 64 and the resistors 63 and 65 a negative mean direct voltage being equal to the amplitude $V_1$ will be obtained. This direct voltage will prevent rectifying by the diode 60 as long as the amplitude of the pulse train applied to that diode does not exceed the value $V_1$ volts. If the amplitude of the applied pulse train exceeds the value $V_1$ volts, these portions will be rectified by the diode 60, and the direct voltage obtained will, after being filtered, be applied to the generator 66 to increase its frequency, until the parts of the pulse train, which exceed the voltage $V_1$, will disappear or be very small, in which case synchronism will be obtained.

The regulation of the phase may obviously occur upon any pulse, which has its earliest position in the modulation interval, irrespective of this pulse being a synchronizing pulse or not. The synchronizing pulse, which every other repetition cycle has its latest possible position in the modulation interval, does not contribute to the regulation of the phase. Because of that the synchronizing pulse could as well be a pulse which is modulated by a direct voltage to the earliest possible position in the modulation interval, but because of a time indicating code being required for the time positions of the channel pulses in the repetition cycle, a maximum modulation of the synchronizing pulse by half the repetition frequency ought to be chosen. Modulation of the synchronizing pulses by a direct voltage is, however, enough, if it is wanted to convert time position modulated pulses into amplitude modulated pulses, e. g. in a relay station.

In the device described above the multivibrator has been brought to flip over from one state to the other at the times of the trailing edges of the trigging pulses. It is also possible to use such a multivibrator coupling, that the multivibrator is caused to flip over at the times of the leading edges of the trigging pulses. In this case a regulation voltage will be obtained in a similar manner as before, the absolute value of said voltage being greater, when the local pulse generator 66 increases its frequency. In this case the local pulse generator thus ought to have a frequency a little higher than the value $n \cdot f$, where $n$ is the number of channels including the synchronizing channel, and $f$ is the repetition frequency of a single channel pulse train in the time position modulated pulse train.

Synchronizing will also be obtained, if the synchronizing pulse train is modulated to its maximum allowed time displacement by another submultiple of the repetition frequency than one half the repetition frequency, as has been described above. But a greater regulation voltage will be obtained to the local pulse generator if a modulation by one half the repetition frequency is used.

As to the durations of the pulses, the sum of the duration of a time position modulated pulse, according to Fig. 2A, and the duration of a pulse from the pulse generator 66, according to Fig. 2B–$B_3$, ought to be less than the safety interval of the time position modulated pulse train, these durations measured at the base line. Suitably the two pulses may be given the same duration.

If desired there may be added to the synchronizing device a converter device 71, see Fig. 1, which latter device is arranged to deliver amplitude modulated pulses. At the cathode 54 of the tube 53 pulses exist, see Fig. 2C–$C_3$, which pulses are duration modulated according to the time position modulation of the corresponding channel pulses. These duration modulated pulses may be arranged to charge a condenser in the device 71, said condenser afterwards being discharged by a constant-current device. The voltage over the condenser is then caused to be tested at equal intervals by a switch, which is controlled by pulses from the pulse generator 66 via the cathode of the tube 67. During the testing times the voltage of the condenser is transmitted through the switch to an output terminal, on which amplitude modulated pulses thus will be obtained, said pulses being amplitude modulated according to the duration modulation of the corresponding duration modulated pulses.

We claim:

1. A device for synchronizing a receiver to the transmitter in a time division multiplex signalling system of the type in which the pulses of each channel are time position modulated and in which synchronizing pulses having the same repetition frequency as one of the pulse series of a single channel are time position modulated to the maximum allowable displacement of the individual channel pulse series, said modulation of the synchronizing pulses being effected by a synchronizing channel modulation frequency which is a submultiple of the synchronizing pulse repetition frequency, said device comprising a pair of electron tubes each having an anode, a cathode and a control grid interconnected to form a duostable multivibrator, an input circuit connected to said multivibrator to flip the same to one stable condition upon receipt of a time position modulated pulse from said input circuit, a local pulse generator generating pulses at a repetition frequency equal to the product of the number of channels by the repetition frequency of a single channel, means connecting said local generator to said multivibrator to flop the same to its other stable condition upon receipt of a pulse from said local generator, an addition device connected to add the voltage waveform of one of the anodes of said multivibrator to the input pulses to provide a composite pulse train, means limiting the amplitude of said waveform to a predetermined maximum value, a rectifier connected to receive said composite pulse train and to pass only portions thereof which exceed said predetermined value to provide a rectified regulating voltage whose amplitude depends upon the repetition frequency and the time position of the pulses from said local generator, and means controlled by said regulating voltage for altering the frequency of said local generator to synchronize it with said channel pulses and thereby to minimize the portions of said composite pulse train which exceed said predetermined value.

2. A device in accordance with claim 1 including a condenser connected to one of said anodes to be charged by the pulses appearing thereon, a constant-current discharge device connected across said condenser, an output terminal, and a switching device controlled by said local generator for periodically connecting said condenser to said output terminal to provide, at said terminal, pulses which are amplitude modulated corresponding to the duration modulation of the pulses at said anode.

References Cited in the file of this patent

UNITED STATES PATENTS

| | | |
|---|---|---|
| 2,536,654 | Miller | Jan. 2, 1951 |
| 2,542,991 | Chatterjea et al. | Feb. 27, 1951 |